Figure 1:
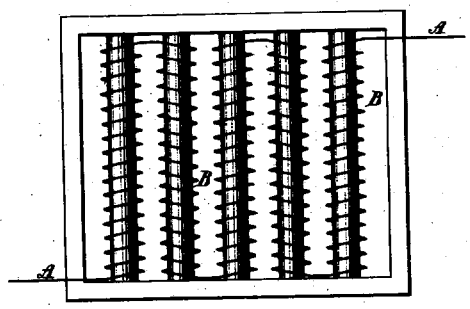

E. WESTON.

ELECTRICAL CONDUCTOR.

No. 10,945. Reissued July 17, 1888.

WITNESSES:

Gustave Dieterich

Edgar Goodwin

INVENTOR

Edward Weston

BY Park Benjamin his ATTORNEY

UNITED STATES PATENT OFFICE.

EDWARD WESTON, OF NEWARK, NEW JERSEY.

ELECTRICAL CONDUCTOR.

SPECIFICATION forming part of Letters Patent No. 10,945, dated July 17, 1888.

Original No. 381,305, dated April 17, 1888. Application for reissue filed May 9, 1888. Serial No. 273,361.

*To all whom it may concern:*

Be it known that I, EDWARD WESTON, a subject of the Queen of Great Britain, and a resident of Newark, in the county of Essex and State of New Jersey, have discovered and invented certain new and useful Improvements in Electrical Conductors, of which the following is a specification, reference being had to the drawings accompanying and forming part of the same.

There are a great many electrical devices containing long lengths of conductor, usually in the form of coils or in convolutions, through which in the use or application of the instrument the current is passed, and in which it is desirable, and often extremely important, to preserve a constant resistance. This is frequently a matter of the greatest difficulty, inasmuch as a strong current is apt to raise the temperature of the conductor, which, with all conductors heretofore used, operates to increase the resistance. In fact, the resistance of all such instruments varies with the temperature of the coils or conductors, to whatever cause such variation in temperature may be due. Among the instruments which are injuriously affected by this property of conductors may be mentioned rheostats, artificial resistances, regulators, electrical meters, indicators, or testing-instruments generally which are connected with a circuit or branch thereof for determining the strength of a current or the potential at any point in a circuit. It is evident that a remedy for this is extremely desirable, as it would add greatly to the value and efficiency of every instrument to which it is applied.

I have discovered, first, that the metal manganese imparts a very high electrical resistance, and, in fact, a higher specific electrical resistance than can be obtained by the addition of any other metal, to alloys into which it enters as a constituent; and, second, that the addition of said manganese has the further remarkable property of rendering the electrical resistance of such alloys nearly or quite constant under varying conditions of temperature. I carry this discovery into practical effect by making electrical conductors, such as the coils or conductors of electrical measuring-instruments, of a metallic alloy containing manganese. An alloy of manganese with copper produces a conductor having the aforesaid characteristics, which is of great excellence for the above-named purposes. This alloy is made by the common process of melting the two metals; but in practice I prefer to employ ferro-manganese on account of its greater cheapness, and this I use in the proportions of copper, seventy parts; ferro-manganese, thirty parts, or thereabout. This alloy is capable of being rolled and drawn, and is made up into wire in the usual way. This wire I use either bare or covered in making the coils or helices of the instruments above referred to.

In the drawings I have shown various forms of coil to which my discovery is advantageously applied.

Figure 2:
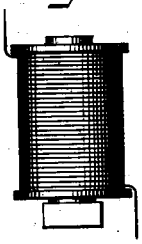
Figure 3:
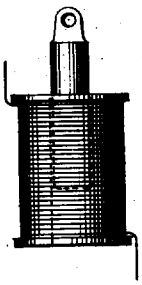
Figure 4:
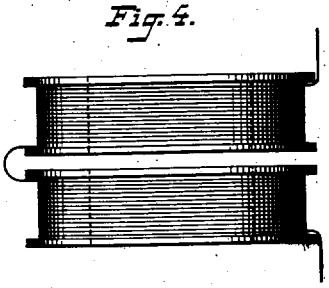

Figure 1 is a common form of artificial resistance, consisting of a bare wire, A, wound on insulating-rods B. This wire, when made of manganese and copper or its equivalent, does not substantially vary in electrical resistance, however much it may become heated from the passage of the current, or from other sources. Fig. 2 is an ordinary form of electro-magnet, such as might be used in a regulator. Fig. 3 is an ordinary form of helix and core, typical of the many forms of electro-magnet used in indicators, meters, and the like. Fig. 4 is a set of coils such as appear in galvanometers.

In all these cases, by making the coils of the alloy above described, the result of substantially constant resistance under varying temperatures is obtained, whereby much labor in adjustment and computation may be saved in the practical use of the instrument. The exact proportion of the metals used may vary somewhat; but while I have found that the addition of manganese or ferro-manganese in any proportion to copper is an advantage, so far as preserving a constant resistance is concerned, I find that the best results are obtained by the use of about seventy parts of copper to thirty of ferro-manganese. This alloy solely as a new composition of matter I do not claim herein.

What I claim is—

1. An electrical conductor consisting of a material the electrical resistance of which is substantially constant under varying temperatures.

2. An electrical conductor composed of an alloy containing manganese, the electrical resistance of which conductor is substantially constant under varying temperatures.

3. In an electrical apparatus, a conductor composed of an alloy containing manganese and copper or its equivalent.

4. A coil or conductor wound in convolutions composed of an alloy of manganese and copper or its equivalent.

5. A coil or conductor wound in convolutions composed of copper and ferro-manganese, in the proportions of seventy parts of copper and thirty parts of ferro-manganese.

6. A rheostat, resistance, or other electrical instrument of the kind herein described, the coils or conductors of which are composed of an alloy of manganese and copper or its equivalent.

EDWARD WESTON.

Witnesses:
PARK BENJAMIN,
EDGAR GOODWIN.